United States Patent
Chourey

(10) Patent No.: US 8,307,081 B1
(45) Date of Patent: Nov. 6, 2012

(54) STAGNANT VISITOR MANAGEMENT FOR ENGAGEMENT PROGRESSION ON WEB SITES

(75) Inventor: Deepesh Chourey, Dublin, CA (US)

(73) Assignee: Limelight Networks, Inc., Tempe, AZ (US)

( * ) Notice: Subject to any disclaimer, the term of this patent is extended or adjusted under 35 U.S.C. 154(b) by 0 days.

(21) Appl. No.: 13/316,359

(22) Filed: Dec. 9, 2011

Related U.S. Application Data

(63) Continuation of application No. PCT/US2011/042039, filed on Jun. 27, 2011.

(51) Int. Cl.
*G06F 15/173* (2006.01)
*G06Q 10/00* (2012.01)

(52) U.S. Cl. ..................... 709/224; 705/26.35

(58) Field of Classification Search .......... 709/224–227; 705/7.13–7.14, 7.33, 26.35
See application file for complete search history.

(56) References Cited

U.S. PATENT DOCUMENTS

| | | | |
|---|---|---|---|
| 6,269,275 | B1 | 7/2001 | Slade |
| 6,564,259 | B1 | 5/2003 | Baber et al. |
| 7,328,177 | B1 | 2/2008 | Lin-Hendel |
| 7,379,965 | B2 | 5/2008 | Sherwood et al. |
| 2003/0167195 | A1* | 9/2003 | Fernandes et al. .............. 705/8 |
| 2004/0225562 | A1 | 11/2004 | Turner |
| 2005/0022103 | A1 | 1/2005 | Yundt-Pacheco |
| 2009/0018896 | A1* | 1/2009 | McGreal .................... 705/10 |
| 2009/0164940 | A1* | 6/2009 | Wampler ..................... 715/808 |

FOREIGN PATENT DOCUMENTS

| | | |
|---|---|---|
| JP | 2009-146325 A | 7/2009 |
| KR | 10-2002-0005147 A | 1/2002 |
| KR | 10-2007-0050310 A | 5/2007 |

OTHER PUBLICATIONS

"The Definitive Blueprint: Lead Management" Retrieved on Mar. 6, 2012 from http://www.hubspot.com/lead-management-software/, 2011, p. 1-2.
International Search Report and Written Opinion of PCT/US2011/042039 mailed on Mar. 12, 2012, 9 pages.
Oracle® TeleSales, Implementation Guide, Release 11i, Feb. 2001, Part No. A86830-03, http://docs.oracle.com/cd/A89549_01/acrobat/ast115ig.pdf, 66 pages.

* cited by examiner

*Primary Examiner* — Chirag R Patel
(74) *Attorney, Agent, or Firm* — Kilpatrick Townsend & Stockton LLP

(57) ABSTRACT

A method and system for customizing web sites for visitor to increase the likelihood a visitor becomes deepens the relationship with the web site or becomes a customer is disclosed. A progression level design defines levels and conditions for moving between those levels. At each level, the web site is customized in predetermined ways commensurate with that level. Information on the visitor is gathered to evaluate their level and possibly upgrade or downgrade that level. Reports detail flow of visitors between levels for various time periods. Where that flow is not desired, the progression level design can be changed by adding, removing or changing levels and conditions.

20 Claims, 11 Drawing Sheets

STAGNANT VISITOR MANAGEMENT FOR ENGAGEMENT PROGRESSION ON WEB SITES

CROSS-REFERENCES TO RELATED APPLICATIONS

This application is a bypass continuation of PCT/US2011/042039, filed Jun. 27, 2011, which is incorporated by reference in its entirety for all purposes.

BACKGROUND

This disclosure relates in general to customer engagement tools and, but not by way of limitation, to web site engagement tools.

Web sites are often an integral plan in advertising product and engaging customers or potential customers. Nurturing those visitors to the web site has traditionally taken expertise, skill and hands-on effort that is impractical to convert visitors into customers. An experienced sales person could size-up a visitor as a prospective customer, but the amount of visitors and their various interaction would overwhelm any sales person trying to manually gather prospects from web site visitors. Web sites have traditionally not yielded as much customers as had been hoped such that its marketing potential is often in question.

There are metric gathering tools and cookies to track user interaction with one or more web sites. Information is provided on web sites through content and third-party advertizing. That information can be tracked to know what users are interacting with and how they are using the web site. Reports containing this information is often poorly organized and of little help in determining what aspects of a web site might result in customer affinity and eventual sales.

There are marketing automation systems that largely use e-mail to deliver prospects to web sites. Campaigns can be designed with varying levels of customization where information is known for prospects. Once the marketing automation system delivers a prospect to a web site, further monitoring of the visitor's interaction with the web site is not performed. Delivering a prospect of the web site through a campaign may have little correlation to making a sale.

SUMMARY

In one embodiment, the present disclosure provides a method and system for customizing web sites for visitor to increase the likelihood a visitor becomes deepens the relationship with the web site or becomes a customer. A progression level design defines levels and conditions for moving between those levels. At each level, the web site is customized in predetermined ways commensurate with that level. Information on the visitor is gathered to evaluate their level and possibly upgrade or downgrade that level. Reports detail flow of visitors between levels for various time periods. Where that flow is not desired, the progression level design can be changed by adding, removing or changing levels and conditions.

In another embodiment, a lead management system for managing visitor interaction with a web site to cause customization the web site for a visitor is disclosed. The lead management system includes a progression design and one or more servers. The progression design includes a plurality of progression levels and a plurality of level qualifications, the plurality of progression levels include a first progression level and a second progression level. One or more servers, that implement the progression design, are programmed to: gather interaction information from a visitor to the web site, assign the visitor to the first progression level from the plurality of progression levels, evaluate the interaction information to determine the visitor has met a first progression condition for movement from the progression level to the second progression level, move the visitor from the first progression level to the second progression level after complying with the first progression condition, monitor inactivity of the visitor with respect to the web site to determine that the visitor has met a second progression condition, move the visitor from the second progression level to another progression level after complying with the second progression condition, and generate a report that conveys movement of a plurality of visitors through the first progression condition and second progression condition, wherein the plurality of visitors include the visitor.

In yet another embodiment, one or more machine-readable medium having machine-executable instructions configured to manage visitor interaction with a web site to cause customization of the web site for a visitor is disclosed. The one or more machine-readable medium comprising code for: receiving a progression design comprising a plurality of progression levels and a plurality of level qualifications, the plurality of progression levels comprising a first progression level and a second progression level; gathering interaction information from a visitor to the web site; assigning the visitor to the first progression level from the plurality of progression levels; evaluating the interaction information to determine the visitor has met a first progression condition for movement from the progression level to the second progression level; moving the visitor from the first progression level to the second progression level after complying with the first progression condition; monitoring inactivity of the visitor with respect to the web site to determine that the visitor has met a second progression condition; moving the visitor from the second progression level to another progression level after complying with the second progression condition; and generating a report that conveys movement of a plurality of visitors through the first progression condition and second progression condition, wherein the plurality of visitors include the visitor.

In still another embodiment, a method for managing visitor interaction with a web site to customize the web site for a visitor is disclosed. In one step, a progression design is received that includes a plurality of progression levels and a plurality of level qualifications, the plurality of progression levels including a first progression level and a second progression level. Interaction information is gathered from a visitor to the web site. The visitor is assigned to the first progression level from the plurality of progression levels. The interaction information is evaluated to determine the visitor has met a first progression condition for movement from the progression level to the second progression level. The visitor is moved from the first progression level to the second progression level after complying with the first progression condition. Inactivity of the visitor with respect to the web site is monitored to determine that the visitor has met a second progression condition. The visitor is moved from the second progression level to another progression level after complying with the second progression condition. A report is generated that conveys movement of a plurality of visitors through the first progression condition and second progression condition, wherein the plurality of visitors include the visitor.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

In the appended figures, similar components and/or features may have the same reference label. Where the reference label is used in the specification, the description is applicable to any one of the similar components having the same reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Figure 1:
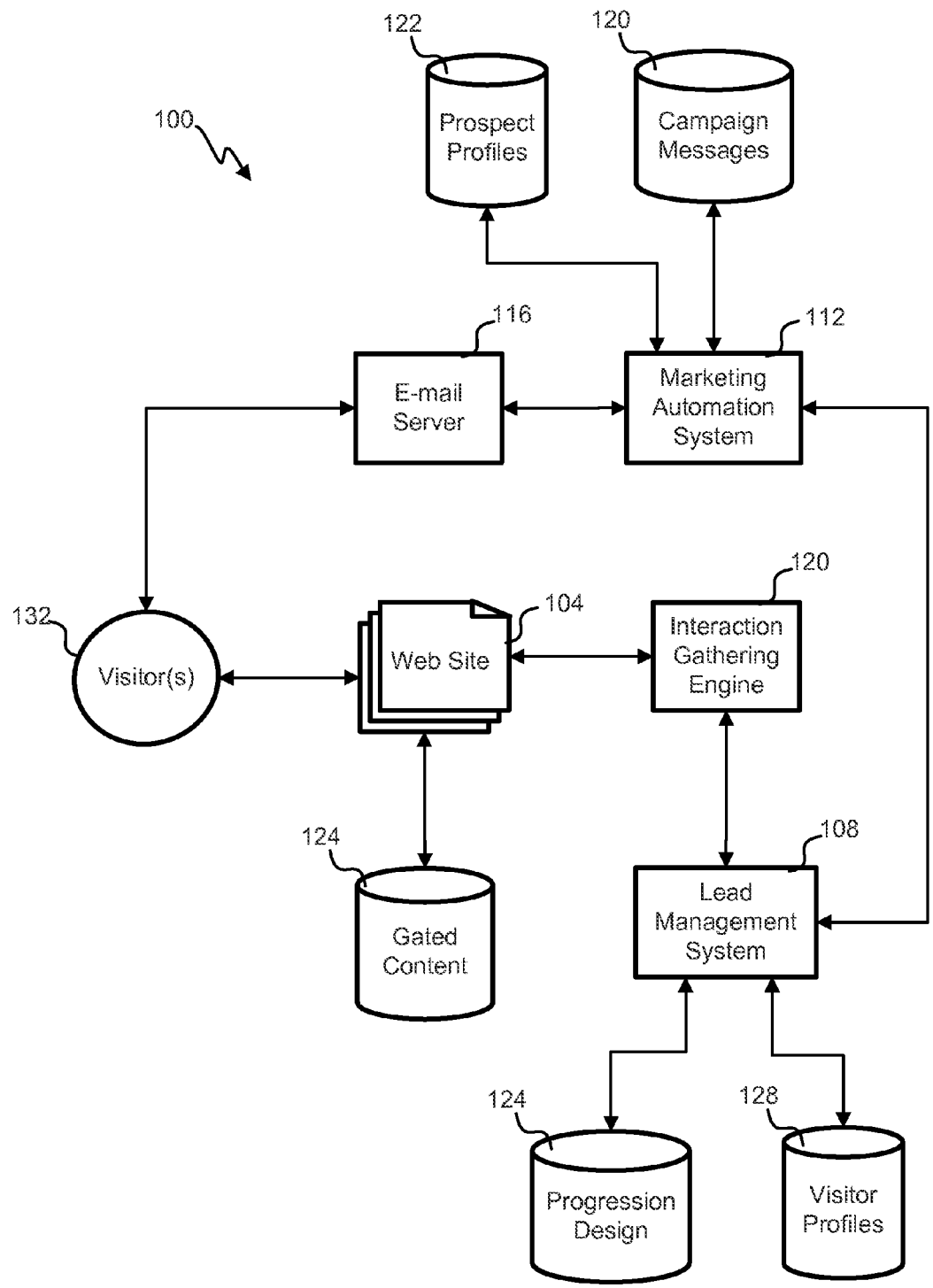
FIG. 1 depicts a block diagram of an embodiment of a lead management system.

Referring first to FIG. 1, a block diagram of an embodiment of a lead management system 100 is shown. Visitors 132 interact with a web site 104 of a customer of the lead management system 108. Them marketing automation system 112 drives prospects to the web site. Although a marketing automation system 112 is shown separately, it could be integral with the lead management system 108 in other embodiments. The lead management system 108 choreographs the web site's interaction with the visitor to hopefully result in a sale to or a deeper relationship with the visitor.

The marketing automation system 112 in this embodiment performs e-mail campaigns on prospects to engage them at the web site 104. Campaign messages 120 are distributed through the e-mail server 116 to prospects that may click-through the e-mail message to a landing pad on the web site 104. The campaign messages 120 can be customized for a particular prospect. Where a prospect becomes a visitor at the web site, the prospect profile 122 can optionally be provided to the interaction gathering engine 120 in some embodiments.

The web site 104 includes an interaction gathering engine 120 that monitors the behavior of visitors 132 on the web site 104 and records demographic information given by visitors 132. The interaction gathering engine 120 could be hosted on the same computer system, hosting service or content delivery network (CDN) as the web site 104. Some demographic information can be provided by external sources, for example, the marketing automation system 112. The web site 104 provides some information to all visitors, but other gated content 124 is only provided to visitors who have reached a particular qualified level.

Information for the user and their behavior on the web site 104 are by the interaction gathering engine. The lead management system 108 takes the information and stores it in visitor profiles 128. Interaction between the lead management system 108 and the marketing automation system 112 allows sharing of profiles 122, 128. Additionally, the lead management system 108 can trigger the marketing automation system 112 to perform an e-mail campaign. Visitors are moved between levels that are defined in a progression design 124. The progression designs are stored for multiple web sites 104. A particular web site 104 has a progress level design stored as a progression design that includes multiple levels that visitors can achieve. Gated content 124 on the web site is content that is only available conditionally in a particular level of the progress level design or under other predetermined circumstances.

Figure 2A:
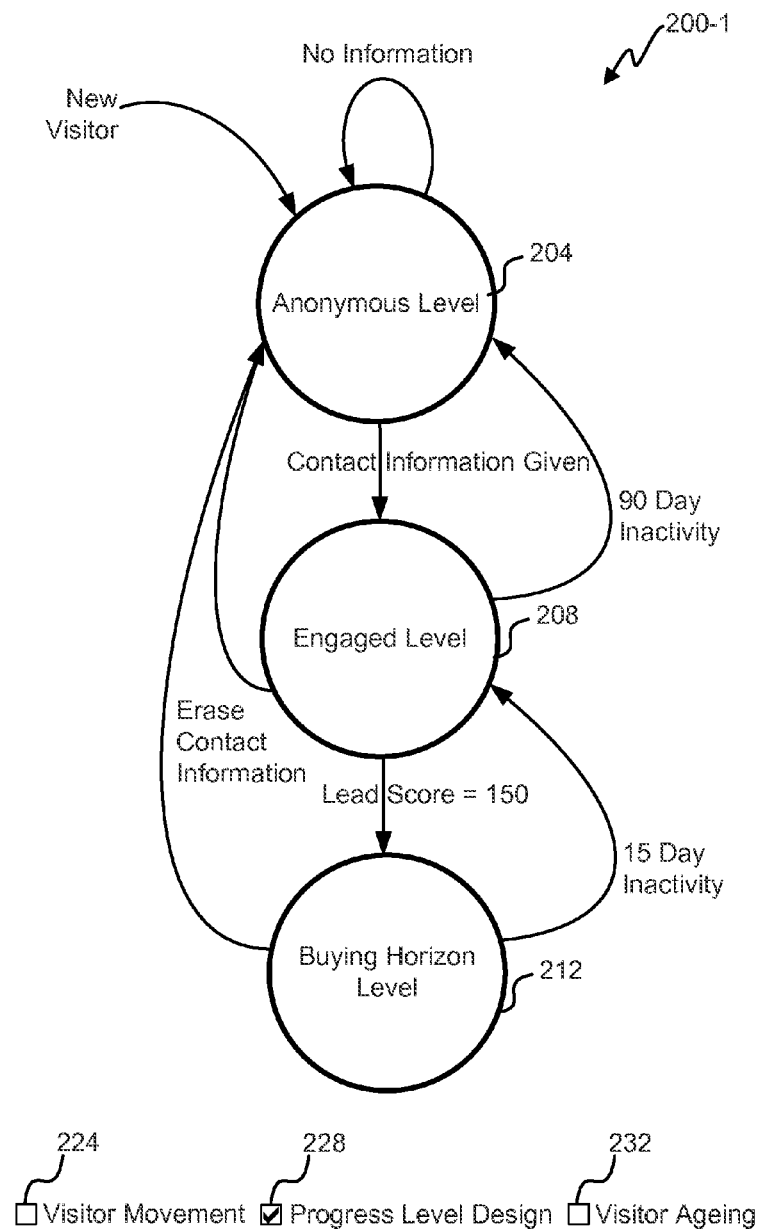
FIGS. 2A and 2B depict a level diagram of embodiments of a progress level design.

With reference to FIG. 2A, a level diagram of an embodiment of a progress level design 200-1 is shown. The interface depicted operates in several modes according to check boxes 224, 228, 232 that allow selection of a visitor movement mode 224, a progress level design mode 228 and a visitor ageing mode 232. In this embodiment, the progress level design mode 228 is selected. The other modes are shown in subsequent figures.

The progress level design 200-1 is stored in as a progression design 124 and can be for a single web site 104 or a group of web sites. This embodiment includes three levels, but there could be any number of levels as defined by a customer of the lead management system. This embodiment includes an anonymous level 204 where visitors 132 first land on the web site 104 without giving any information. Once information is given by the visitor or the marketing automation system 112, the visitor progresses to an engaged level 208.

For each visitor 132 that is identified, a lead score is tracked. The lead score can be a function of the amount of interaction where different actions are given different scores. For example, downloading a white paper, providing additional demographic information, answering questions, viewing video or audio content, reading web pages, browsing time, or other behavioral information is scored to change the lead score. Additionally, the demographic or other information provided to the web site 104 can affect the lead score. For example, a purchasing manager title given may be scored higher than the title of janitor. Once a lead score of 150 is reached in this embodiment, the visitor moves to a buying horizon level 212.

Reports of stagnant visitors are generated so that remedial action can be manually or automatically taken. For example, a visitor might be moved from a later-stage level to an earlier-stage level where there has been a period of inactivity. This keeps the highly-qualified leads in the later-stage levels to a minimum to reduce the visitors that are unlikely to be customers. In this embodiment, stagnant visitors are automatically moved from the buying horizon level 212 to the engaged level 208 after 15 days of inactivity and from the engaged level 208 to the anonymous level 204 after ninety days of inactivity. Additionally, a visitor 132 in this embodiment moves back to the anonymous level 204 where the visitor 132 manually erases contact information previously given to the web site 104.

Figure 2B:
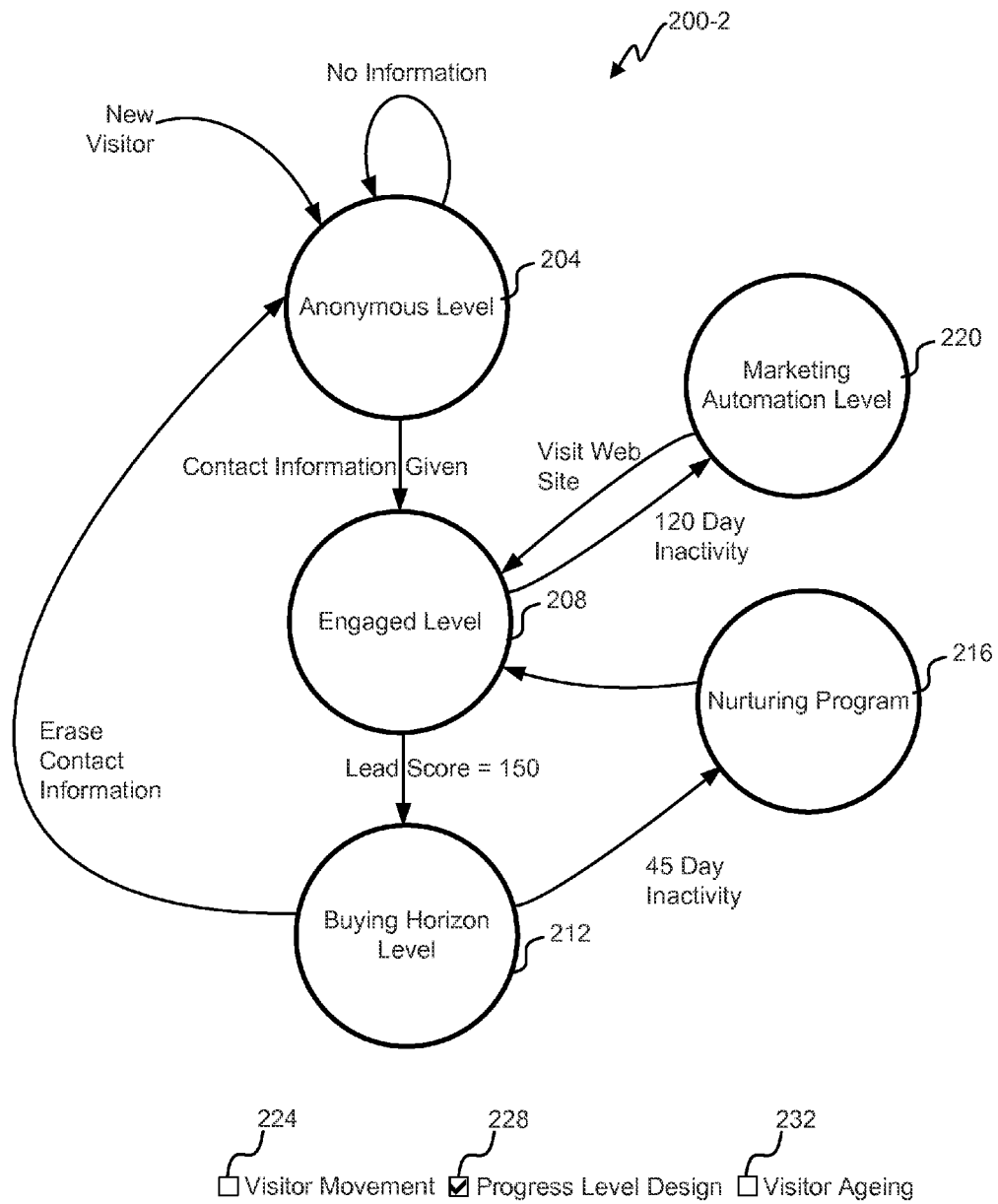

Referring next to FIG. 2B, a level diagram of an embodiment of a progress level design 200-2 is shown. This embodiment adds a couple more levels over the embodiment of FIG. 2B. The number of levels and conditions that move between levels is unlimited and only bounded by the complexity desired by the customer. When in the buying horizon level 212 and there has been 45 days without interaction with the web site 104 by the visitor, the visitor is moved to a nurturing program level 216. Any number of things could be done in this level to make the web site 104 or customer more inviting to the visitor before returning to the engaged level 208. For example, advertizing could be removed from the web site 104, coupons could be offered, personalization of the web site 104 for the visitor could be performed, representatives of the web site could call, text or e-mail the visitor, etc.

After 120 days of inactivity in the engaged level 208, the visitor could be moved by the lead management system 108 to the marketing automation level. In this level, the marketing automation system 112 is provided any additional visitor profile information 128 to perform one or more e-mail messages to the visitor 132 to encourage their return to the web site 104. With a return to the web site 104 by the visitor, they would return to the engaged level 208.

Figure 3:
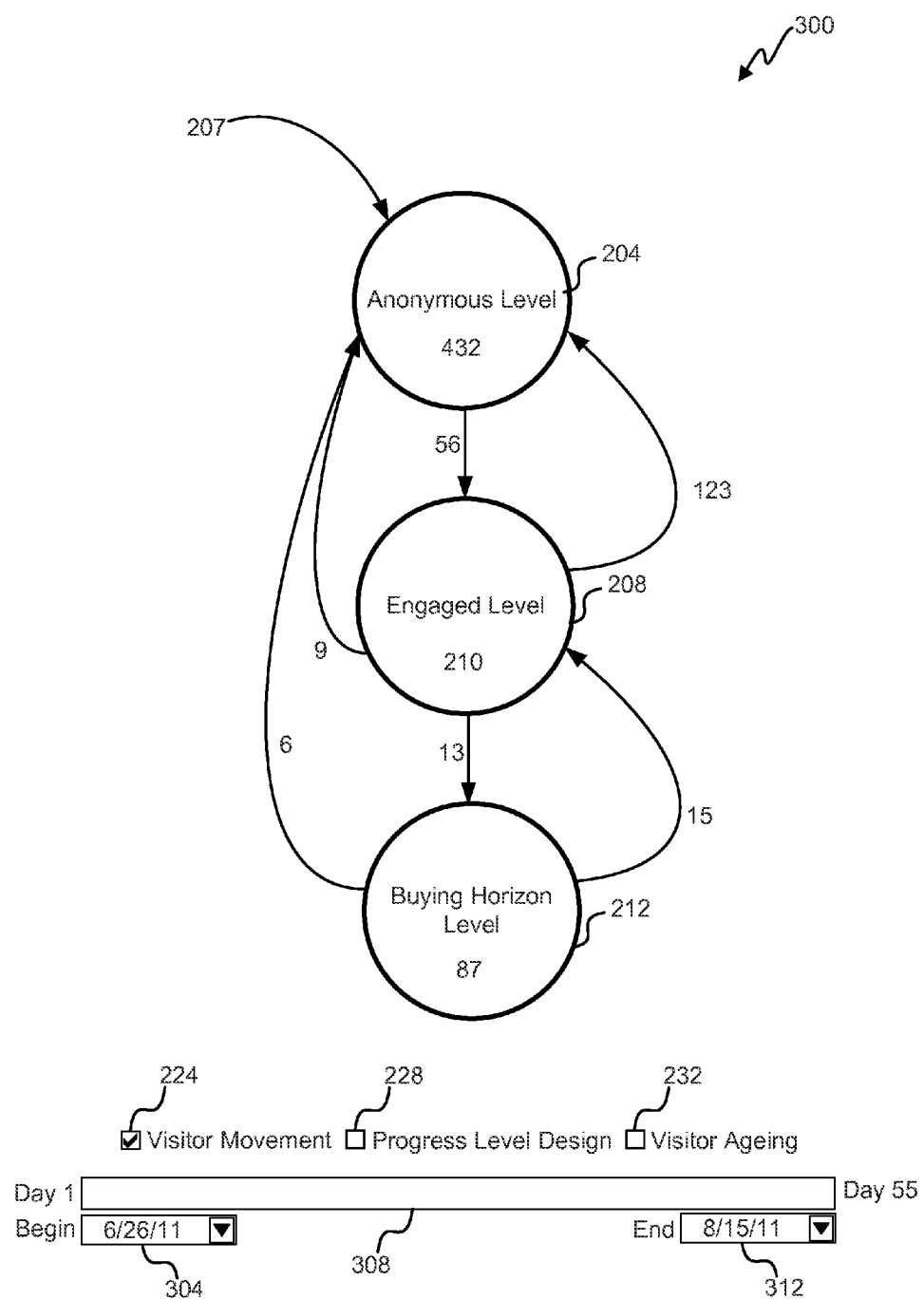
FIG. 3 depicts a level diagram of an embodiment that shows visitor movement.

With reference to FIG. 3, an embodiment a level diagram 300 of that shows visitor movement is presented. The visitor movement mode 224 is selected, which pulls-up uses a time range control 308 specified with a begin pulldown control 304 and an end pulldown control 312. The time range control 308 shows the days in the range. A particular point or sub-range of days can be selected on the time range control 308 to narrow the dataset used.

For each conditional line between levels, the number of visitors 132 is shown for the given time range chosen. In this way, any unusual flows of visitors 132 can be observed to improve the progress level design. For example, a large number of visitors 132 are returning to the anonymous level 204 from the engaged level 208 because of inactivity. The remedial action could be to add in a nurturing level or perform an e-mail campaign to reengage the visitors 132.

The average number of visitors 132 in a particular level for the date range is also displayed in the level diagram 300. In this example, the anonymous level 204 has 432 visitors 132 on average. Where an unexpected number of visitors 132 are stuck at a particular level, more levels could be added to finesse out what could be a problem. For example, the anonymous level 204 has some new visitors 132 and some that have returned for a higher level. Those to groups could have their own level to treat them differently by the web site 104.

Figure 4A:
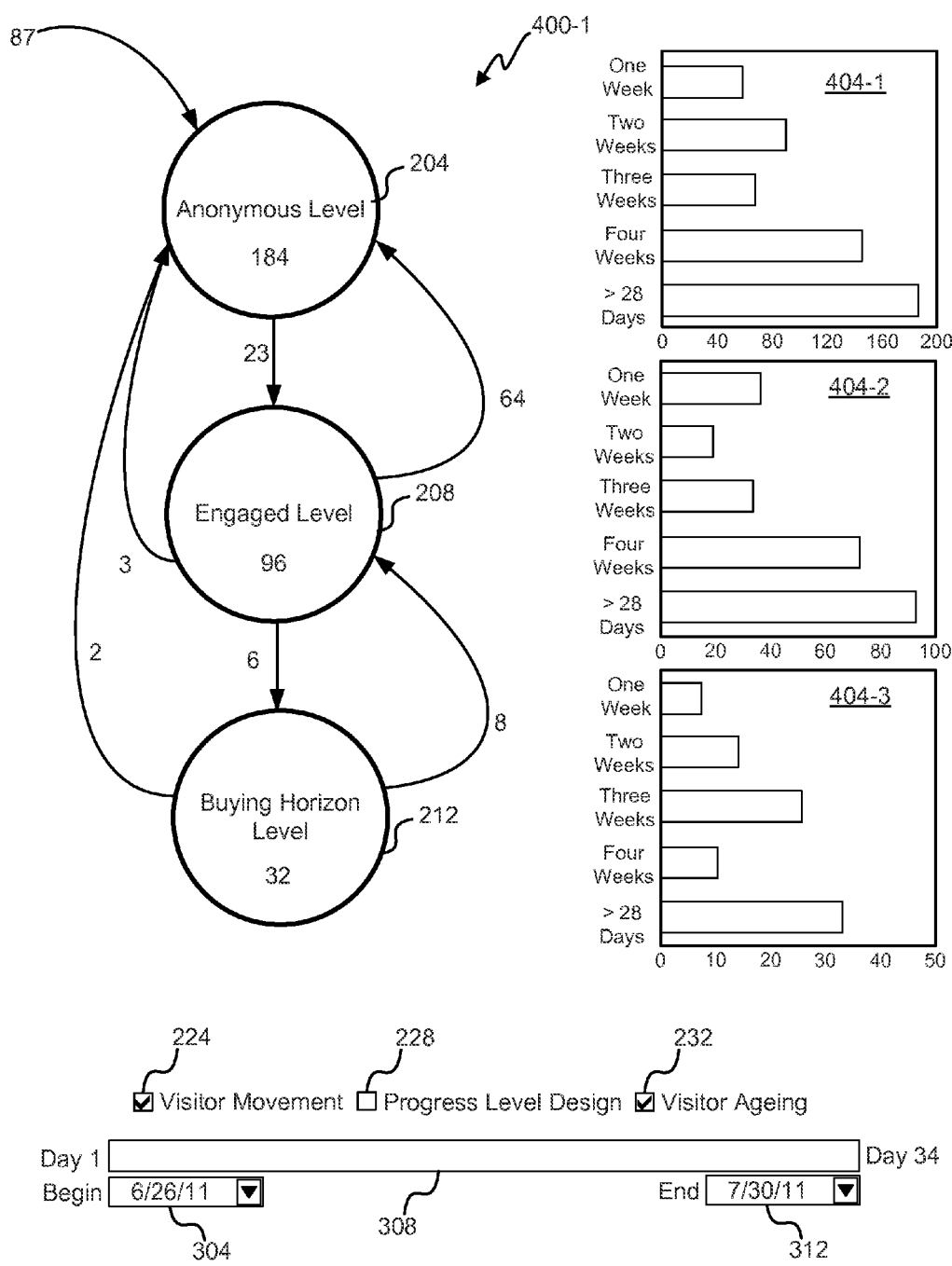
FIGS. 4A and 4B depict a level diagram of embodiments showing visitor ageing in various levels.

Referring next to FIG. 4A, an embodiment of a level diagram 400-1 showing visitor ageing in various levels is depicted. The visitor movement control 224 and the visitor ageing control 232 are active. The explanation of the visitor movement control 224 is not reiterated here, but follows the description above in relation to FIG. 3. The values given are average values for the specified thirty-four day time period.

The visitor ageing control 232 places charts next to each level that show how long visitors 132 have been at each level. For complex level diagrams, the charts for individual levels could be put in a hover control or turned on or off individually.

A barchart is used in this embodiment to show the number of visitors in each sub-range of dates. For example, there are seven visitors 132 that have been in the buying horizon level 212 for one week, thirteen for between one week and two weeks, twenty-six for between two and three weeks, eleven for between three and four weeks, and thirty-three for longer than one month.

Although barcharts are used in this embodiment, other embodiments could use other charts or even display raw data. For example, a curve could be shown that indicates the number of visitors that have been stagnant for each day in the range. The barchart could be rotated. Some embodiments could allow more or less grouping of the staleness date ranges.

Figure 4B:
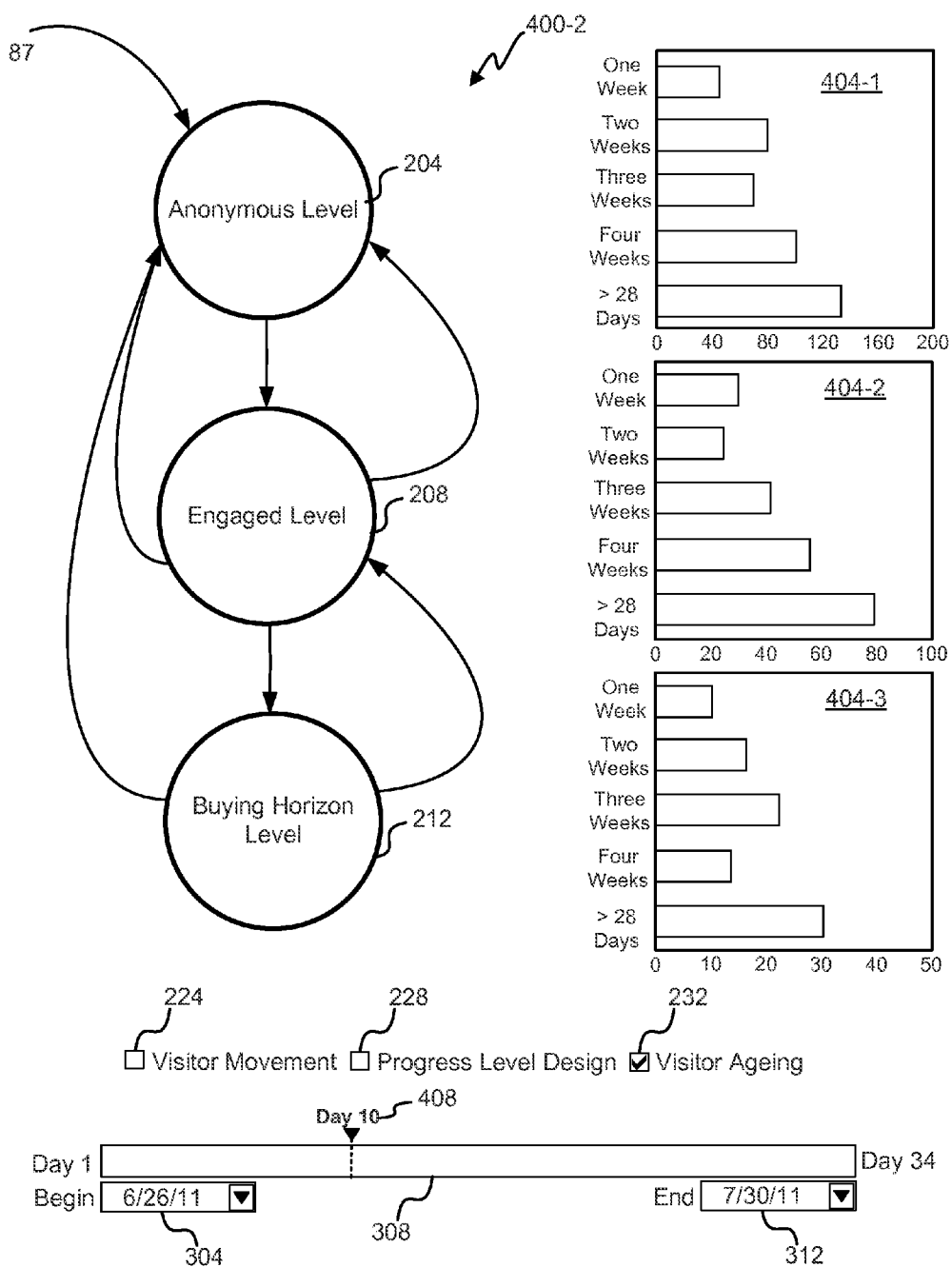

With reference to FIG. 4B, an embodiment of a level diagram 400-2 showing visitor ageing in various levels is depicted. In this example, only the visitor ageing control 232 is active. Additionally, the time range control 308 has been used to select values for a particular day in the range of days available. The barcharts are updated to reflect data for Day 10 or July $6^{th}$. The time range control 308 could be manipulated by dragging to select a number of days as a subrange in the thirty-four days of data.

Figure 5:
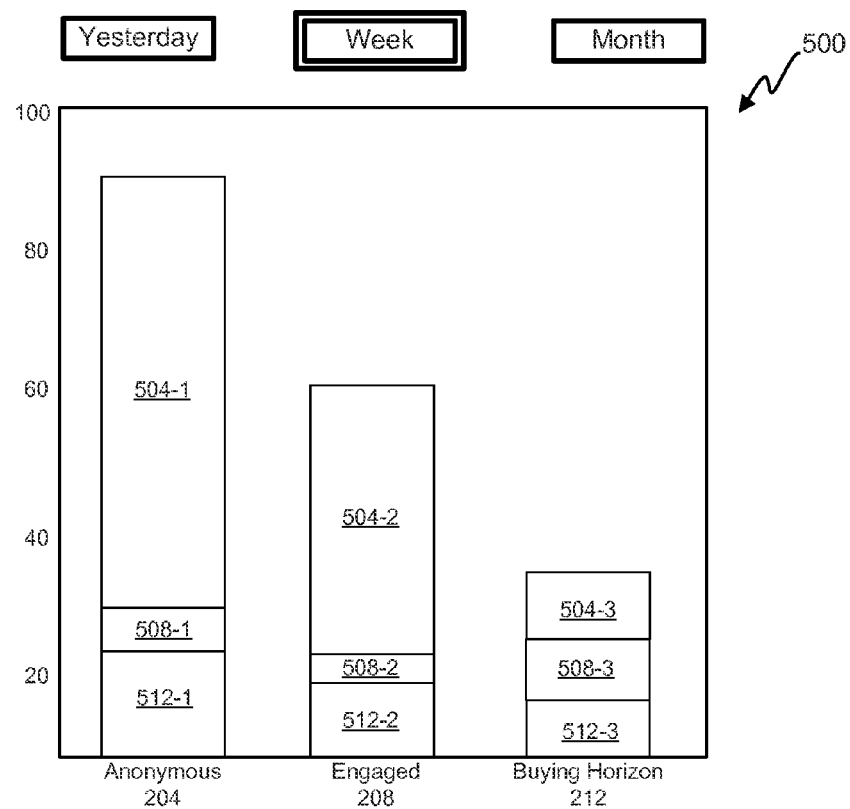
FIG. 5 depicts a chart of an embodiment showing aggregate movement for each level.

Referring next to FIG. 5, a chart of an embodiment 500 showing aggregate movement for each level is shown over a week period. This embodiment has three levels arranged from low to high from the perspective that a higher level is more likely to become a customer. The barchart is for the last week of information, but the prior day or month could also be shown. Additionally, selection of a custom date range could be done. For each level, the number of static visitors 504 (i.e., those that have stayed in the particular level) is shown along with those that moved from a lower level 512 (i.e., forward movement toward being a customer). For example, in the engaged level 208 there are sixty visitors 132 who stayed the entire week, seven visitors were degraded from a higher level and eighteen visitors were enhanced from a lower level.

Figure 6:
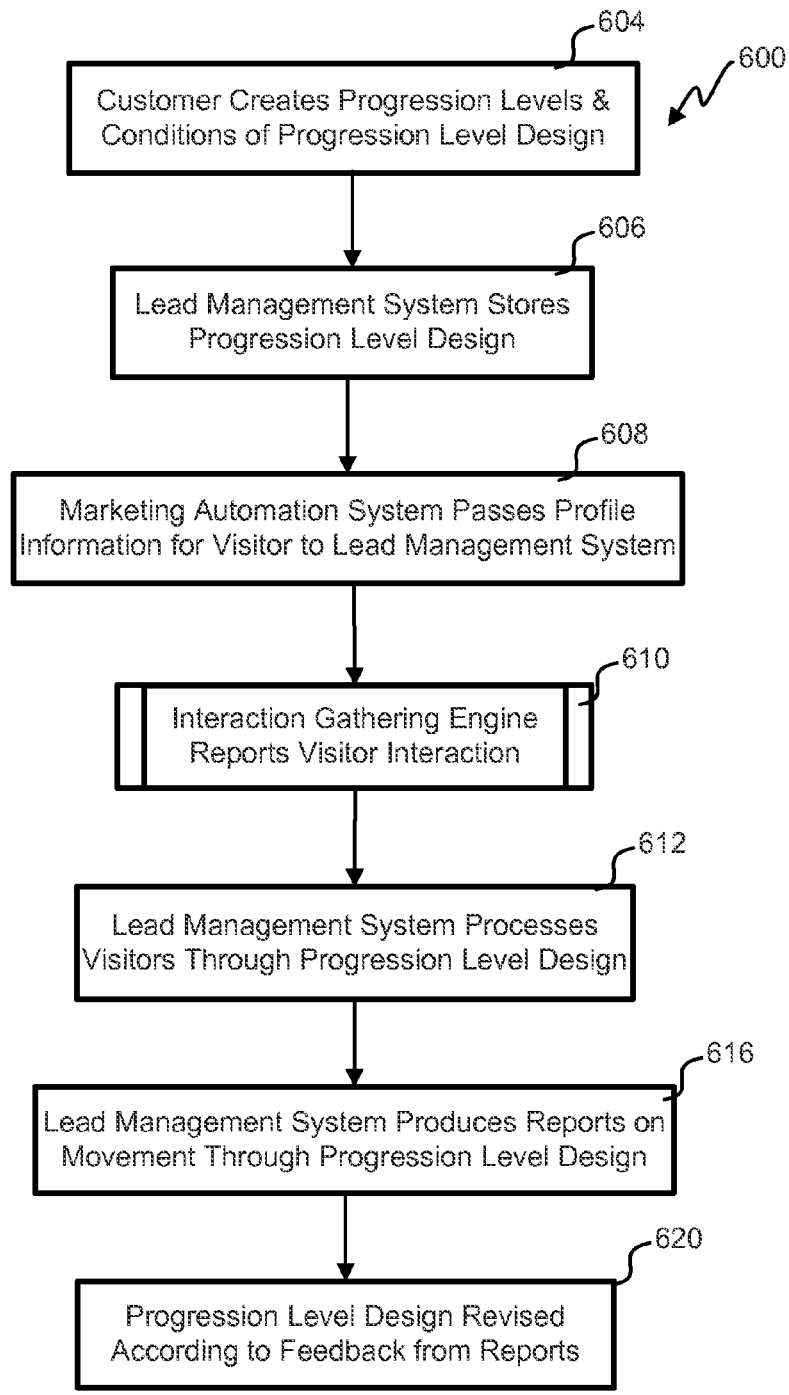
FIG. 6 illustrates a flowchart of an embodiment of a process for managing leads.

With reference to FIG. 6, a flowchart of an embodiment of a process 600 for managing leads is shown. The depicted portion of the process 600 begins in block 604 where a customer creates progression levels and conditions for moving between those levels. The progression level design is stored in by the lead management system 108 as a progression design 124 in block 606. Any prospect profiles 122 are passed to the visitor profiles 128 when the viewer 132 clicks through to the web site 104 in block 608. The interaction gathering engine 120 reports information from the viewer 132 that could be expressed by the viewer 132 or behavior of the viewer 132 in block 610.

The lead management system 108 controls the web site 104 according to the progression level design in block 612. In this way, each viewer 132 receives a customized experience according to what they have done previously. For example, certain gated content 124 is only made available to visitors beyond a threshold in their lead score or at a particular level. Additionally, the advertizing could change, the suggested content could be updated, the quality of service (QoS) could be changed, etc.

In block 616, the lead management system 108 produces various reports. The reports are viewed by customers of the lead management system 108 to determine how the progression level design can be improved. The reports could be displayed, printed or sent in electronic form to the customers. An interface to the lead management system 108 allows for interaction with the reports. In this embodiment, the lead management system 108 is software as a service in the cloud, but in other embodiments, the lead management system 108 could be enterprise software integral or in communication with the web site 104. In bock 620, the progression level designed is updated with more or less levels and conditions, etc. to improve performance and convert more visitors 132 into customers.

Figure 7:
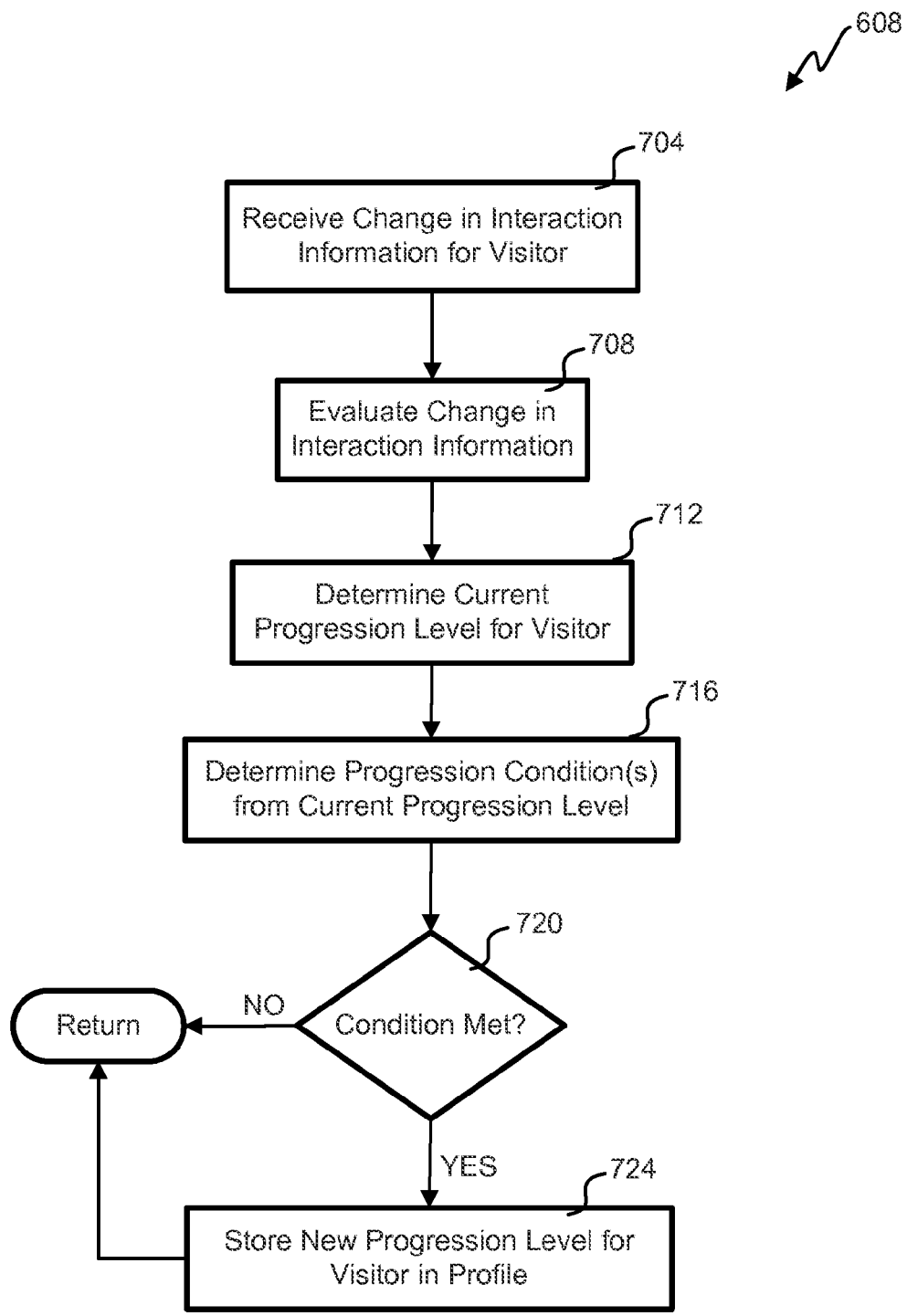
FIG. 7 illustrates a flowchart of an embodiment of a process for gathering interaction between visitors and a web site.

Referring next to FIG. 7, a flowchart of an embodiment of a process 628 for gathering interaction between visitors and a web site is shown. The process 628 corresponds to block 628 in FIG. 6. The depicted portion of the process begins in block 704 where the visitor profile 128 is updated with information gathered by the interaction gathering engine 120, the marketing automation system 112 or elsewhere. Staleness (i.e., elapsed time without interaction between visitor and web site) is information that is updated in the visitor profile 128. The gathered information is evaluated to update the lead score in block 708.

In bock 712, the current progression level is retrieved from the visitor profile 128. It is determined in block 716 if any of the conditions to exit from the current progression level. If none of the conditions are met as determined in block 720, no changes to level are made. Where a condition is met, the new progression level is stored for the visitor 132 in the visitor profile 128 in block 724. The behavior of the web site 104 is automatically updated for the visitor 132 according to the new progression level.

A number of variations and modifications of the disclosed embodiments can also be used. For example, customization of a web site is described, but the same customizations could be performed by application software, a run-time applet, a smart-phone application, or any software function that provide information to potential customers.

Figure 8:
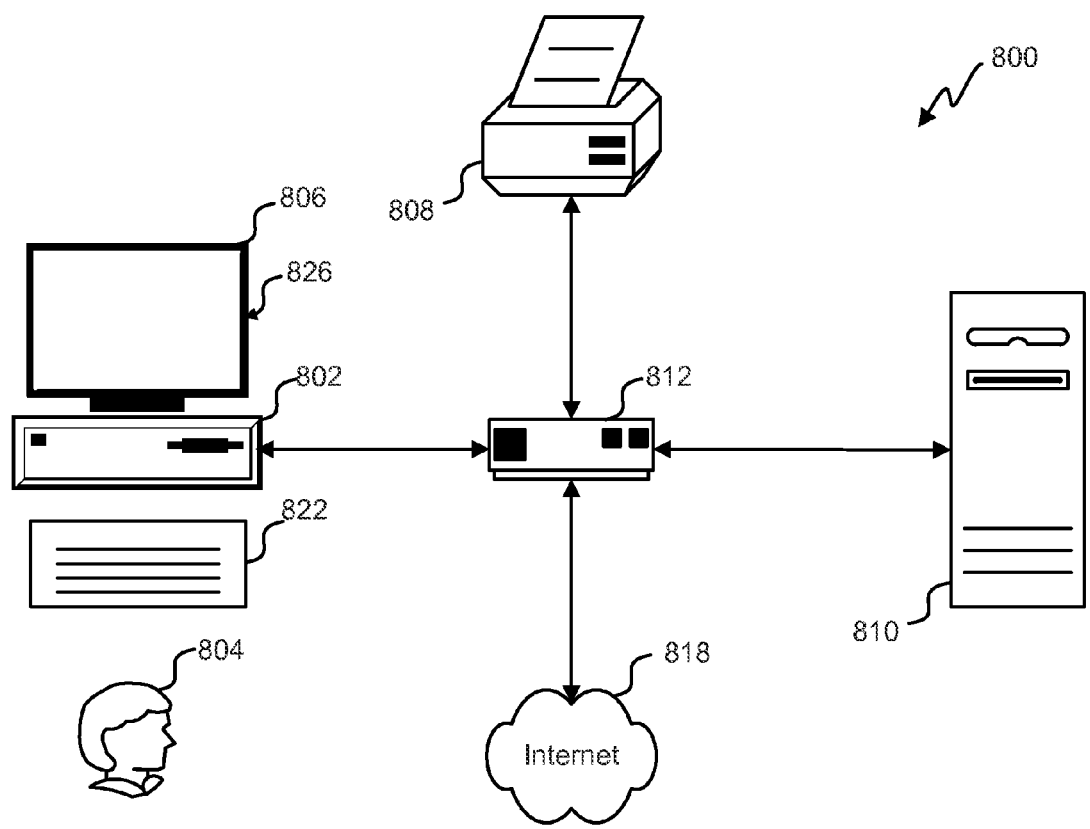
FIG. 8 depicts a block diagram of an embodiment of a computer system.

Referring next to FIG. 8, an exemplary environment with which embodiments may be implemented is shown with a computer system 800 that can be used by a designer 804 to design, for example, electronic designs. The computer system 800 can include a computer 802, keyboard 822, a network router 812, a printer 808, and a monitor 806. The monitor 806, processor 802 and keyboard 822 are part of a computer system 826, which can be a laptop computer, desktop computer, handheld computer, mainframe computer, etc. The monitor 806 can be a CRT, flat screen, etc.

A designer 804 can input commands into the computer 802 using various input devices, such as a mouse, keyboard 822, track ball, touch screen, etc. If the computer system 800 comprises a mainframe, a designer 804 can access the computer 802 using, for example, a terminal or terminal interface. Additionally, the computer system 826 may be connected to a printer 808 and a server 810 using a network router 812, which may connect to the Internet 818 or a WAN.

The server 810 may, for example, be used to store additional software programs and data. In one embodiment, software implementing the systems and methods described herein can be stored on a storage medium in the server 810. Thus, the software can be run from the storage medium in the server 810. In another embodiment, software implementing the systems and methods described herein can be stored on a storage medium in the computer 802. Thus, the software can be run from the storage medium in the computer system 826. Therefore, in this embodiment, the software can be used whether or not computer 802 is connected to network router 812. Printer 808 may be connected directly to computer 802, in which case, the computer system 826 can print whether or not it is connected to network router 812.

Figure 9:
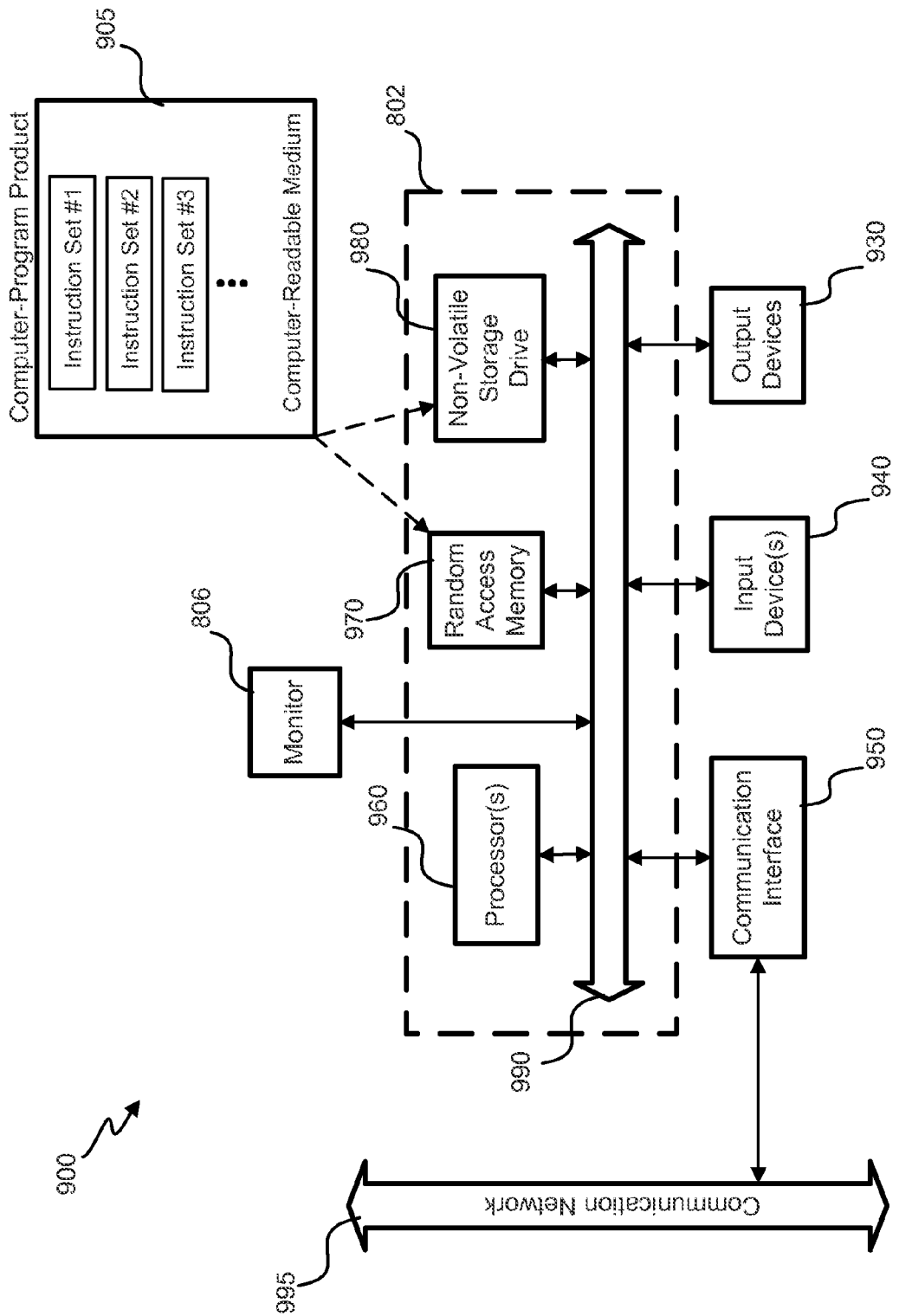
FIG. 9 depicts a block diagram of an embodiment of a special-purpose computer system.

With reference to FIG. 9, an embodiment of a special-purpose computer system 900 is shown. The lead management system 108 and marketing automation system 112 are examples of a special-purpose computer system 900. The above methods may be implemented by computer-program products that direct a computer system to perform the actions of the above-described methods and components. Each such computer-program product may comprise sets of instructions (codes) embodied on a computer-readable medium that directs the processor of a computer system to perform corresponding actions. The instructions may be configured to run in sequential order, or in parallel (such as under different processing threads), or in a combination thereof. After loading the computer-program products on a general purpose computer system 826, it is transformed into the special-purpose computer system 900.

Special-purpose computer system 900 comprises a computer 802, a monitor 806 coupled to computer 802, one or more additional user output devices 930 (optional) coupled to computer 802, one or more user input devices 940 (e.g., keyboard, mouse, track ball, touch screen) coupled to computer 802, an optional communications interface 950 coupled to computer 802, a computer-program product 905 stored in a tangible computer-readable memory in computer 802. Computer-program product 905 directs system 900 to perform the above-described methods. Computer 802 may include one or more processors 960 that communicate with a number of peripheral devices via a bus subsystem 990. These peripheral devices may include user output device(s) 930, user input device(s) 940, communications interface 950, and a storage subsystem, such as random access memory (RAM) 970 and non-volatile storage drive 980 (e.g., disk drive, optical drive, solid state drive), which are forms of tangible computer-readable memory.

Computer-program product 905 may be stored in non-volatile storage drive 980 or another computer-readable medium accessible to computer 802 and loaded into memory 970. Each processor 960 may comprise a microprocessor, such as a microprocessor from Intel® or Advanced Micro Devices, Inc.®, or the like. To support computer-program product 905, the computer 802 runs an operating system that handles the communications of product 905 with the above-noted components, as well as the communications between the above-noted components in support of the computer-program product 905. Exemplary operating systems include Windows® or the like from Microsoft Corporation, Solaris® from Sun Microsystems, LINUX, UNIX, and the like.

User input devices 940 include all possible types of devices and mechanisms to input information to computer system 802. These may include a keyboard, a keypad, a mouse, a scanner, a digital drawing pad, a touch screen incorporated into the display, audio input devices such as voice recognition systems, microphones, and other types of input devices. In various embodiments, user input devices 940 are typically embodied as a computer mouse, a trackball, a track pad, a joystick, wireless remote, a drawing tablet, a voice command system. User input devices 940 typically allow a user to select objects, icons, text and the like that appear on the monitor 806 via a command such as a click of a button or the like. User output devices 930 include all possible types of devices and mechanisms to output information from computer 802. These may include a display (e.g., monitor 806), printers, non-visual displays such as audio output devices, etc.

Communications interface 950 provides an interface to other communication networks and devices and may serve as an interface to receive data from and transmit data to other systems, WANs and/or the Internet 818. Embodiments of communications interface 950 typically include an Ethernet card, a modem (telephone, satellite, cable, ISDN), a (asynchronous) digital subscriber line (DSL) unit, a FireWire® interface, a USB® interface, a wireless network adapter, and the like. For example, communications interface 950 may be coupled to a computer network, to a FireWire® bus, or the like. In other embodiments, communications interface 950 may be physically integrated on the motherboard of computer 802, and/or may be a software program, or the like.

RAM 970 and non-volatile storage drive 980 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 970 and non-volatile storage drive 980 may be configured to store the basic programming and data constructs that provide the functionality of various embodiments of the present invention, as described above.

Software instruction sets that provide the functionality of the present invention may be stored in RAM 970 and non-volatile storage drive 980. These instruction sets or code may be executed by the processor(s) 960. RAM 970 and non-volatile storage drive 980 may also provide a repository to store data and data structures used in accordance with the present invention. RAM 970 and non-volatile storage drive 980 may include a number of memories including a main random access memory (RAM) to store of instructions and data during program execution and a read-only memory (ROM) in which fixed instructions are stored. RAM 970 and non-volatile storage drive 980 may include a file storage subsystem providing persistent (non-volatile) storage of program and/or data files. RAM 970 and non-volatile storage drive 980 may also include removable storage systems, such as removable flash memory.

Bus subsystem 990 provides a mechanism to allow the various components and subsystems of computer 802 communicate with each other as intended. Although bus subsystem 990 is shown schematically as a single bus, alternative embodiments of the bus subsystem may utilize multiple busses or communication paths within the computer 802.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A lead management system for managing visitor interaction with a web site to cause customization the web site for a visitor, the lead management system comprising:
   a progression design comprising a plurality of progression levels and a plurality of level qualifications, the plurality of progression levels comprising a first progression level and a second progression level;
   one or more servers that implement the progression design, the one or more servers programmed to:

gathering interaction information from a visitor to the web site, assigning the visitor to the first progression level from the plurality of progression levels, evaluating the interaction information to determine the visitor has met a first progression condition for movement from the progression level to the second progression level, moving the visitor from the first progression level to the second progression level after complying with the first progression condition, monitoring inactivity of the visitor with respect to the web site to determine that the visitor has met a second progression condition, moving the visitor from the second progression level to another progression level after complying with the second progression condition, and generating a report that conveys movement of a plurality of visitors through the first progression condition and second progression condition, wherein the plurality of visitors include the visitor.

2. The lead management system for managing visitor interaction with the web site to cause customization the web site for the visitor as recited in claim 1, wherein material on the web site is accessible while the visitor is in the second progression level, but the material is not accessible while the visitors is in the first progression level.

3. The lead management system for managing visitor interaction with the web site to cause customization the web site for the visitor as recited in claim 1, wherein the report is generated over a user-entered time period.

4. The lead management system for managing visitor interaction with the web site to cause customization the web site for the visitor as recited in claim 1, wherein the first progression condition requires certain interaction between the visitor and the web site.

5. The lead management system for managing visitor interaction with the web site to cause customization the web site for the visitor as recited in claim 1, wherein the first progression condition requires certain information be given by the visitor to the web site.

6. The lead management system for managing visitor interaction with the web site to cause customization the web site for the visitor as recited in claim 1, further comprising scoring interaction information to assign a lead score to the visitor, wherein the first progression condition is a threshold for the lead score.

7. One or more non-transitory machine-readable medium having machine-executable instructions configured to manage visitor interaction with a web site to cause customization of the web site for a visitor, the one or more machine-readable medium comprising code for:

receiving a progression design comprising a plurality of progression levels and a plurality of level qualifications, the plurality of progression levels comprising a first progression level and a second progression level;

gathering interaction information from a visitor to the web site;

assigning the visitor to the first progression level from the plurality of progression levels;

evaluating the interaction information to determine the visitor has met a first progression condition for movement from the progression level to the second progression level;

moving the visitor from the first progression level to the second progression level after complying with the first progression condition;

monitoring inactivity of the visitor with respect to the web site to determine that the visitor has met a second progression condition;

moving the visitor from the second progression level to another progression level after complying with the second progression condition; and generating a report that conveys movement of a plurality of visitors through the first progression condition and second progression condition, wherein the plurality of visitors include the visitor.

8. One or more non-transitory machine-readable medium having machine-executable instructions configured to manage visitor interaction with the web site to cause customization of the web site for the visitor as recited in claim 7, wherein the another progression level is the first progression level.

9. One or more non-transitory machine-readable medium having machine-executable instructions configured to manage visitor interaction with the web site to cause customization of the web site for the visitor as recited in claim 7, wherein material on the web site is accessible while the visitor is in the second progression level, but the material is not accessible while the visitors is in the first progression level.

10. One or more non-transitory machine-readable medium having machine-executable instructions configured to manage visitor interaction with the web site to cause customization of the web site for the visitor as recited in claim 7, wherein the another progression level nurtures the visitor before returning the visitor to the first or second progression levels.

11. One or more non-transitory machine-readable medium having machine-executable instructions configured to manage visitor interaction with the web site to cause customization of the web site for the visitor as recited in claim 7, wherein the first progression condition requires certain interaction between the visitor and the web site.

12. One or more non-transitory machine-readable medium having machine-executable instructions configured to manage visitor interaction with the web site to cause customization of the web site for the visitor as recited in claim 7, wherein the first progression condition requires certain information be given by the visitor to the web site.

13. One or more non-transitory machine-readable medium having machine-executable instructions configured to manage visitor interaction with the web site to cause customization of the web site for the visitor as recited in claim 7, further comprising scoring interaction information to assign a lead score to the visitor, wherein the first progression condition is a threshold for the lead score.

14. A method for managing visitor interaction with a web site to customize the web site for a visitor, the method comprising:

receiving a progression design comprising a plurality of progression levels and a plurality of level qualifications, the plurality of progression levels comprising a first progression level and a second progression level;

gathering interaction information from a visitor to the web site;

assigning the visitor to the first progression level from the plurality of progression levels;

evaluating the interaction information to determine the visitor has met a first progression condition for movement from the progression level to the second progression level;

moving the visitor from the first progression level to the second progression level after complying with the first progression condition;

monitoring inactivity of the visitor with respect to the web site to determine that the visitor has met a second progression condition;

moving the visitor from the second progression level to another progression level after complying with the second progression condition; and generating a report that conveys movement of a plurality of visitors through the first progression condition and second progression condition, wherein the plurality of visitors include the visitor.

15. The method for managing visitor interaction with the web site to customize the web site for the visitor as recited in claim 14, wherein the another progression level is the first progression level.

16. The method for managing visitor interaction with the web site to customize the web site for the visitor as recited in claim 14, wherein material on the web site is accessible while the visitor is in the second progression level, but the material is not accessible while the visitors is in the first progression level.

17. The method for managing visitor interaction with the web site to customize the web site for the visitor as recited in claim 14, wherein the report is generated over a user-entered time period.

18. The method for managing visitor interaction with the web site to customize the web site for the visitor as recited in claim 14, wherein the another progression level nurtures the visitor before returning the visitor to the first or second progression levels.

19. The method for managing visitor interaction with the web site to customize the web site for the visitor as recited in claim 14, wherein the first progression condition requires certain information be given by the visitor to the web site.

20. The method for managing visitor interaction with the web site to customize the web site for the visitor as recited in claim 14, further comprising scoring interaction information to assign a lead score to the visitor, wherein the first progression condition is a threshold for the lead score.

* * * * *